No. 721,798. PATENTED MAR. 3, 1903.
F. HAGEN.
SNAPPING ROLLS FOR CORN HUSKING MACHINES.
APPLICATION FILED DEC. 31, 1901.
NO MODEL.

Witnesses:
M. L. Taylor
E. Behel

Inventor
Fredrick Hagen
By A. O. Behel
Atty.

UNITED STATES PATENT OFFICE.

FREDRICK HAGEN, OF BELVIDERE, ILLINOIS.

SNAPPING-ROLLS FOR CORN-HUSKING MACHINES.

SPECIFICATION forming part of Letters Patent No. 721,798, dated March 3, 1903.

Application filed December 31, 1901. Serial No. 87,894. (No model.)

*To all whom it may concern:*

Be it known that I, FREDRICK HAGEN, a citizen of the United States, residing at Belvidere, in the county of Boone and State of Illinois, have invented certain new and useful Improvements in Snapping-Rolls for Corn-Husking Machines, of which the following is a specification.

The object of this invention is to construct snapping-rolls for corn-husking machines by which the cornstalks will be drawn through without cutting them off and the ears of corn will be snapped from the stalks.

Figure 1:
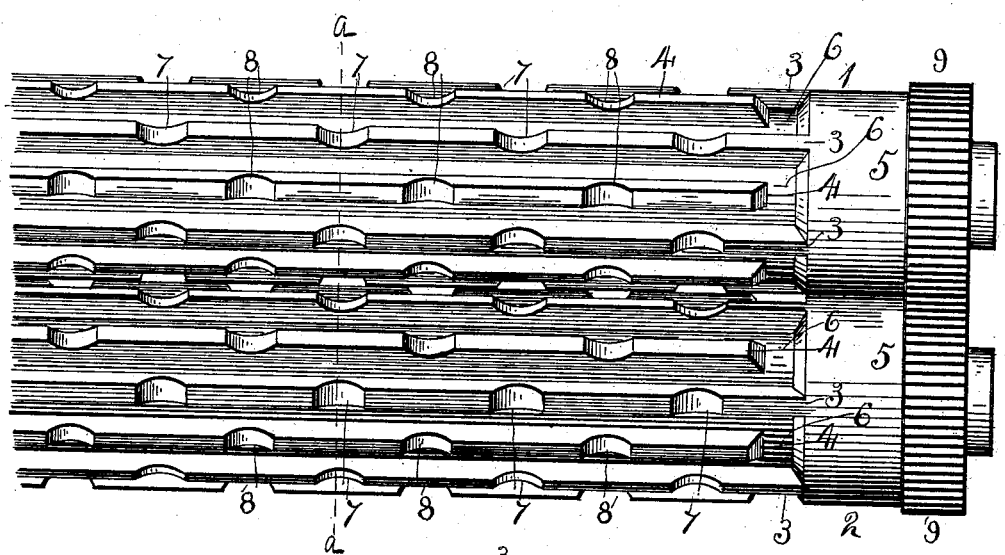
Figure 2:
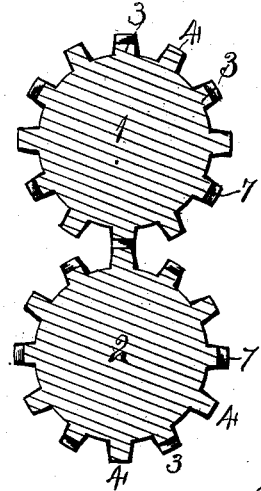

In the accompanying drawings, Figure 1 is a side elevation of my improved snapping-rolls. Fig. 2 is a transverse section on dotted line a, Fig. 1.

The two rolls 1 and 2 are the duplicate of each other and comprise two series of lengthwise ribs 3 and 4. The ribs 3 connect the heads 5, and the ribs 4 do not extend the full distance between the heads 5, leaving space 6. The ribs 3 have recesses 7 in their outer faces, and the ribs 4 have recesses 8 in their outer faces. The recesses of the ribs 3 are located centrally between the recesses of the ribs 4. In use I prefer to locate the rolls with respect to each other as shown in the drawings—that is, the short ribs of one roll are located to run opposite the long ribs of the other roll, and the recess of one roll comes centrally between the recesses of the other roll. Gears 9 connect the two rolls and form the means for rotating them and insures their rotating in proper relation with each other. The rolls rotate toward each other, and the cornstalks are generally fed in butt-end first, and the recesses permit the stalks to enter sufficiently so that a hold may be obtained upon them. The rotation of the rolls will draw the stalks through until an ear of corn is reached, and before the ear is snapped from the husk the rolls will have secured a hold upon the husk, thereby carrying the husks, with the stalks, through the rolls. The stalks in passing through the rolls are not flattened sufficiently to cut them off, as the stalks are located in the recesses in passing through. At the meeting-point between the rolls, as shown at Fig. 2, each alternate recess in the top roll and one-twelfth of a revolution will place the recesses at the same point in the bottom roll, so that the stalks are received alternately in the recesses, the recesses of one roll and the solid portion of the ribs of the other roll always coming together. By making some of the ribs short a recess is formed, into which the stalks can enter in order that a hold may be had upon them.

I claim as my invention—

A pair of like snapping-rolls for a corn-husking machine, each roll comprising a series of lengthwise ribs, each rib having a series of facial depressions, the length of the depressions being less than the space between them, and the depressions of one rib being between the spaces of the adjacent rib.

FREDRICK HAGEN.

Witnesses:
A. O. BEHEL,
E. BEHEL.